United States Patent
Selby

(10) Patent No.: US 8,621,345 B2
(45) Date of Patent: Dec. 31, 2013

(54) INTERCEPTING TEXT STRINGS TO PREVENT EXPOSING SECURE INFORMATION

(75) Inventor: Michael Selby, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 989 days.

(21) Appl. No.: 11/488,953

(22) Filed: Jul. 19, 2006

(65) Prior Publication Data

US 2008/0034286 A1  Feb. 7, 2008

(51) Int. Cl.
*G06F 17/24*  (2006.01)

(52) U.S. Cl.
USPC ............................................. 715/271

(58) Field of Classification Search
USPC .................... 715/260, 271; 726/22
See application file for complete search history.

(56) References Cited

U.S. PATENT DOCUMENTS

| | | | | |
|---|---|---|---|---|
| 4,933,896 A * | 6/1990 | Sakai | | 715/246 |
| 5,796,948 A * | 8/1998 | Cohen | | 709/206 |
| 6,442,607 B1 * | 8/2002 | Korn et al. | | 709/225 |
| 6,631,482 B1 * | 10/2003 | Marks | | 714/45 |
| 7,152,244 B2 * | 12/2006 | Toomey | | 726/26 |
| 7,174,453 B2 * | 2/2007 | Lu | | 713/154 |
| 7,496,628 B2 * | 2/2009 | Arnold et al. | | 709/206 |
| 7,523,498 B2 * | 4/2009 | Fellenstein et al. | | 726/22 |
| 7,861,301 B2 * | 12/2010 | Fellenstein et al. | | 726/22 |
| 2002/0198940 A1 * | 12/2002 | Bower et al. | | 709/204 |
| 2003/0159071 A1 * | 8/2003 | Martinez et al. | | 713/202 |
| 2003/0218627 A1 * | 11/2003 | Gusler et al. | | 345/736 |
| 2004/0128552 A1 * | 7/2004 | Toomey | | 713/201 |
| 2004/0177271 A1 * | 9/2004 | Arnold et al. | | 713/201 |
| 2005/0262557 A1 * | 11/2005 | Fellenstein et al. | | 726/22 |
| 2009/0119579 A1 * | 5/2009 | Fellenstein et al. | | 715/234 |

OTHER PUBLICATIONS

D'Anjou, Jim et al. "Using Java Development Tools in Eclipse". May 30, 2003, informIT.*
Wainwright, Peter. "Pro Perl", p. 546, Mar. 25, 2005, Apress.*

* cited by examiner

*Primary Examiner* — Cesar Paula
*Assistant Examiner* — Tyler J Schallhorn

(57) ABSTRACT

To prevent exposing secure information, a first alphanumeric string is received and compared to a second alphanumeric string. After comparing the first alphanumeric string to the second alphanumeric string, it is determined whether the first alphanumeric string includes one of a limiting character and an instruction to send a message. The first alphanumeric string may be modified based on a result of comparing the first alphanumeric string to the second alphanumeric string, thereby altering the first alphanumeric string, and the first alphanumeric string, as modified, may be transmitted.

20 Claims, 3 Drawing Sheets

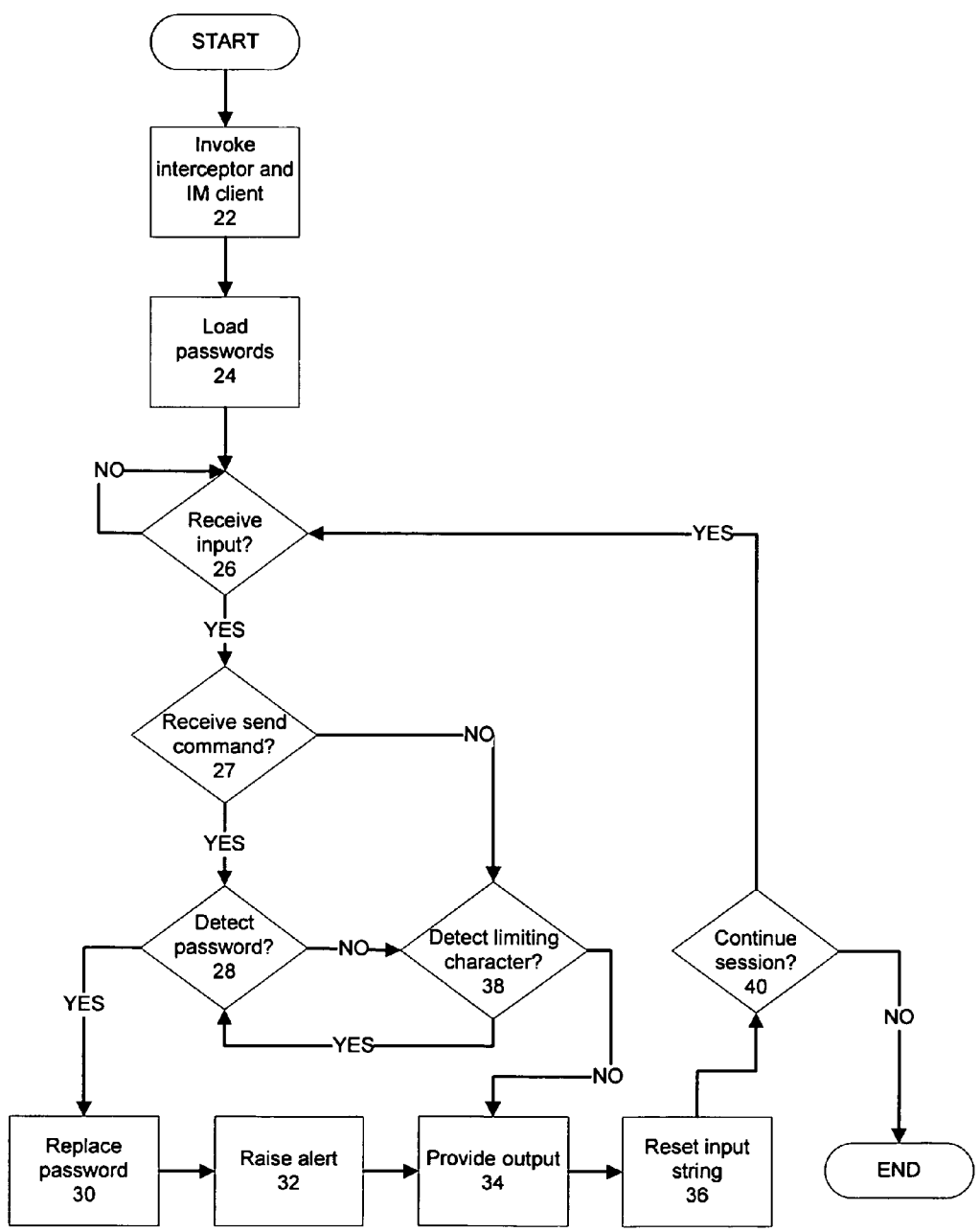

INTERCEPTING TEXT STRINGS TO PREVENT EXPOSING SECURE INFORMATION

BACKGROUND INFORMATION

Modern computers offer the capability of multi-tasking, that is, running more than one application at once. Consequently, many users frequently have open on their computer desktops numerous application windows at a time. For example, a user may cause his or her computer to simultaneously run multiple applications, possibly including, for example, a word processor, a web browser, a telnet session window, a terminal client emulator, an instant messaging (IM) client, an e-mail client, etc. While only one window may be active, i.e., available for the user to provide input to, at a time, different windows may be made active by the simple click of a mouse, selection of toggle keys (e.g., ALT-TAB in WINDOWS® operating system), etc. Frequently, because users are unaware or confused as to which application window is active, users will provide textual input intended for one application window to another. For example, it is not uncommon for users to enter a text string intended for one application in another application's window.

In many cases, providing textual input to the wrong application window, while irritating and inconvenient to the user, is nonetheless innocuous. For example, providing textual input to a window not configured to accept such has no effect at all, other than requiring the user to re-input text once the correct application window is made active. In other cases, providing textual input to the wrong application window is more inconvenient, e.g., causing the user to have to cut text from a word processor window and paste it into a spreadsheet window. Yet other cases present more serious concerns. For example, providing textual input to an IM window that was intended for another window can have serious ramifications because such a user error could result in the transmission of textual information to third parties that the user wishes to keep private and/or secure. Moreover, the risk of such inadvertent transmission is high, because IM client windows can look like other windows requiring the entry of information such as user identifiers and passwords, e.g., telnet windows, web browsers, terminal client emulators, etc. Further, once mistakenly-entered textual information has been provided to an IM client and sent to an IM server, it is impossible to recover or protect.

Presently, applications such as IM clients have limited mechanisms for detecting and protecting mistakenly entered textual data. For example, some IM clients include a feature known as "auto-correct" that detects strings identified by the user and, in real-time or near real-time, and automatically replaces those strings with other strings as specified by the user. However, auto-correct functionality as presently known suffers from a number of significant drawbacks.

First, present auto-correct features generally do not operate until after a limiting character such as a space character or a carriage return character has been entered. However, few user identifiers and passwords include limiting characters such as space characters or carriage return characters. Therefore, present auto-correct features generally will not detect a mistakenly entered user identifiers and password until after a user has selected an "enter" key or other mechanism for transmitting confidential information such as a user name and password.

Further, auto-correct features usually depend on a dictionary file that is generally not encrypted, and that is generally stored in plain-text format. Thus, from a security perspective, present auto-correct features offer little protection.

Moreover, present auto-correct functionality is designed to substitute correct text for incorrect text. However, in the case where a sensitive text string, such as a password, is being entered, the exact opposite of auto-correct functionality is desired. That is, when a password or other sensitive text string is accidentally entered into an input window such as an IM client, it would be advantageous to replace the actual password or other correct text string with an incorrect representation of the text string.

Accordingly, what is needed is the ability to detect predetermined text string in real-time or near real-time with depending on the entry of a specific character. What is also needed is the ability to store and retrieve pre-determined text strings from an encrypted database or file, thus ensuring the security of sensitive data. Further, what is needed is the ability to replace a correct text string or actual representation of a sensitive text string with an incorrect representation of the string so as to avoid the accidental sharing of sensitive information.

BRIEF DESCRIPTION OF THE DRAWINGS

FIG. 4 illustrates a second process for intercepting text strings, according to an embodiment.

DETAILED DESCRIPTION OF THE PREFERRED EMBODIMENTS

Figure 1:
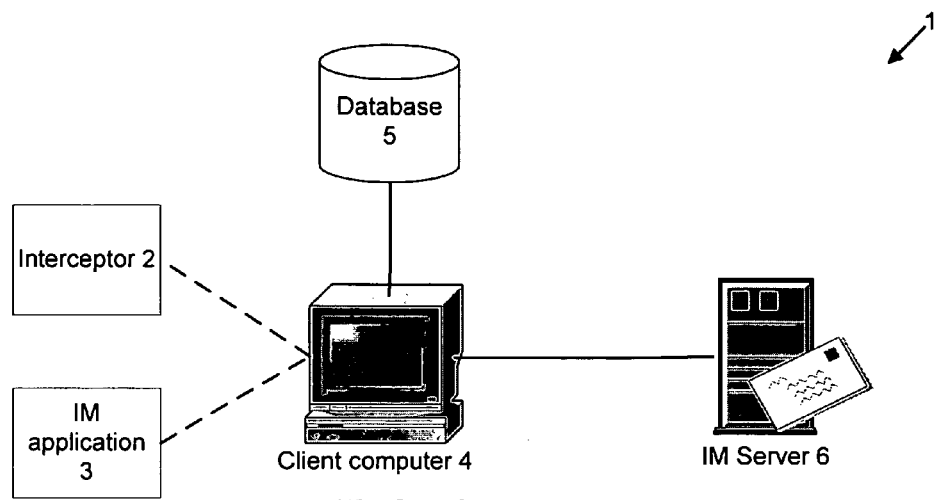
FIG. 1 illustrates an interceptor and an instant messaging system, according to an embodiment.

FIG. 1 illustrates an instant messaging (IM) system 1, according to an embodiment.

Interceptor 2 works in association with IM client 3 to formulate and send instant messages from client computer 4, which is in communication with database 5 and IM server 6. Interceptor 2 may be incorporated into IM client 3, or may be a separate add-on module, or plug-in. In addition, embodiments are possible in which interceptor 2 is a separate, stand-alone software application from IM client 3.

IM client 3 can be anyone of a number of software applications capable of providing IM functionality to client computer 4, such as TRILLIAN™ software from CERULEAN STUDIOS™ located in Connecticut and on the world wide web at cerulean.com. IM client 3 is generally installed and generally runs on client computer 4.

Client computer 4 may include anyone of a number of computing devices known to those skilled in the art, including, without limitation, a computer workstation, a desktop, notebook, laptop, or handheld computer, or some other computing device known to those skilled in the art, such as a JAVA™ software enabled cellular telephone or similar device. Computing devices such as the foregoing may employ any of a number of computer operating systems known to those skilled in the art, including, but by no means limited to, known versions and/or varieties of the MICROSOFT WINDOWS® operating system, the UNIX™ operating system (e.g., the SOLARIS® operating system distributed by SUN MICROSYSTEMS® of Menlo Park, Calif.), the AIX UNIX™ operating system distributed by INTERNATIONAL BUSINESS MACHINES® of Armonk, N.Y., and the LINUX® operating system.

Client computer 4 and database 5 may each include instructions executable by one or more computing devices such as those listed above. For example, interceptor 2 and IM client 3 generally comprise one or more sets of computer executable instructions. Such instructions may be compiled or interpreted from computer programs created using a variety of programming languages and/or technologies known to those skilled in the art, including, without limitation, and either alone or in combination, JAVA™, C, C++, VISUAL BASIC™, JAVA SCRIPT™, and PERL™, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Database 5 is used to store sample strings 1, generally in an encrypted format, and generally comprises a structured file (e.g., comma delimited, tab delimited, etc.) or a relational database management system (RDBMS) as known to those skilled in the art. An RDBMS generally employs the well known Structured Query Language (SQL) in addition to a language for creating, storing, editing, and executing stored procedures. However, it is to be understood that database 5 may be some other kind of database such as a hierarchical database, a file, a set of files, an application database in a proprietary format, etc. Database 5 generally includes a computing device employing a computer operating system such as one of those mentioned above, and is stored on client computer 4 or is accessed via a network such as is known to those skilled in the art, such as a local area network (LAN), wide area network (WAN), etc.

Figure 2:
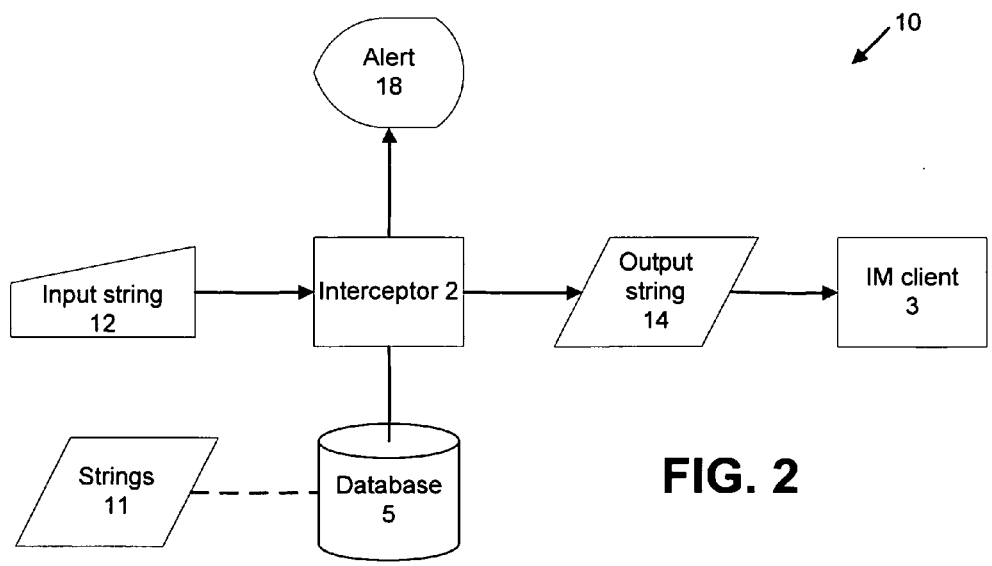
FIG. 2 illustrates a text string interceptor system, according to an embodiment.

FIG. 2 illustrates a text string interceptor system 10, according to an embodiment. When IM client 3 is active, e.g., is the active application window in the Windows desktop, interceptor 2 receives all input strings 12 intended for IM client 3. Upon receiving input string 12, interceptor 2 checks input string 12 against a list of sample strings 11 stored in an encrypted format in database 5, as is described in more detail below. If no match is found with input string 12 and a string 11 stored in database 5, output string 14 matches input string 12. However, if a match is found with input string 12 and a string 11 found in database 5, output string 14 may be modified or altered to disguise the data provided in input string 12, as is also described in more detail below. In any case, output string 14 is generally provided to IM client 3 and may be sent as part or all of an instant message.

Database 5 is generally provided with a predetermined list of sample strings 11 to be protected, each of which is stored in database 5 in an encrypted format. Various methods for encrypting and decrypting data are known to those skilled in the art, such as Pretty Good Privacy (PGP), Advanced Encryption Standard (AES), etc. Further, those skilled in the art will understand that there a number of ways in which one or more text strings, e.g., user passwords, could be provided to database 5. For example, in one embodiment, a graphical user interface (GUI) is provided for users to enter sample strings 11 to be stored in database 5. Such sample strings 11 may be masked when entered (e.g., one more asterisks shown in place of the actual text string that is entered) to further protect sensitive information even as it is being entered. Methods of providing sample strings 11 to database 5 from a GUI are known to those skilled in the art, as are other methods for providing sample strings 11 to database 5, such as loading a file, etc.

Figure 3:
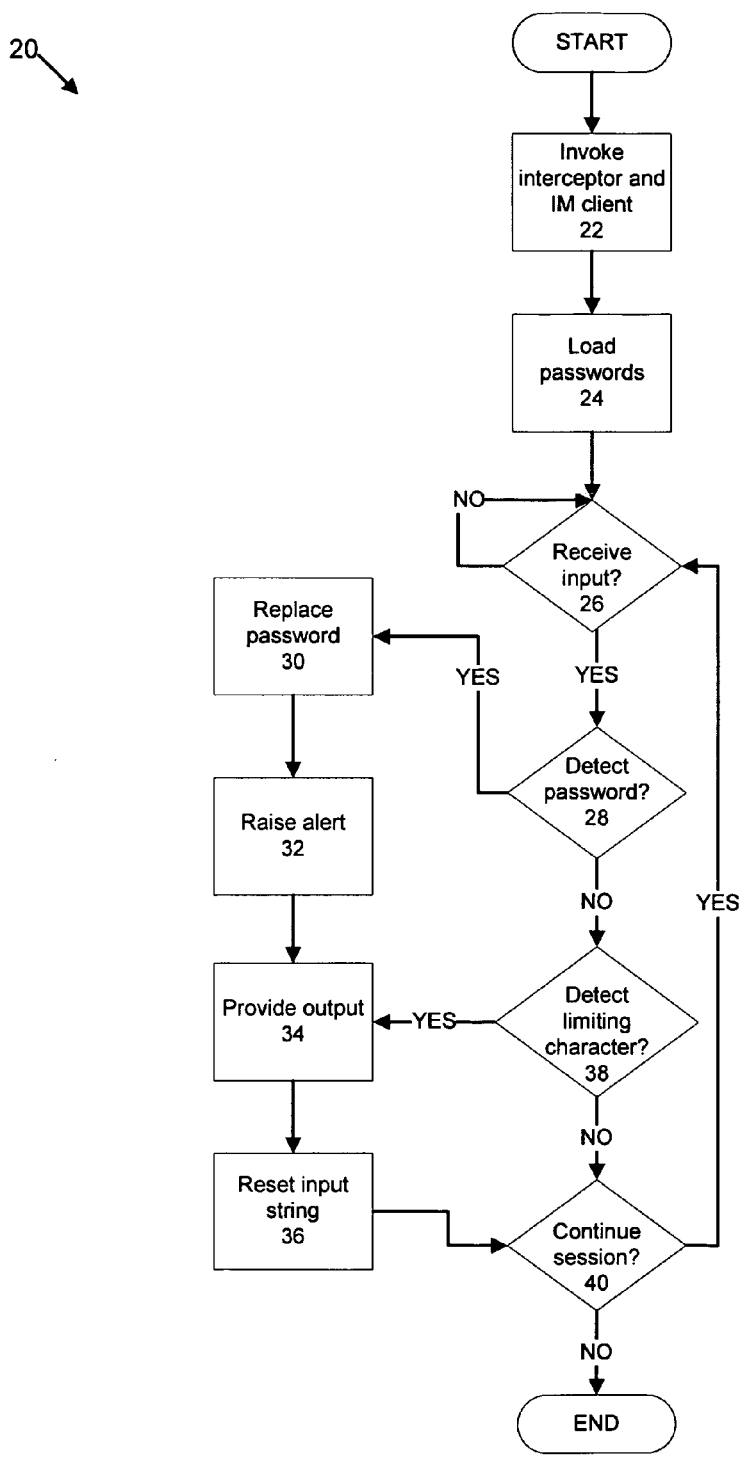
FIG. 3 illustrates a process for intercepting text strings, according to an embodiment.

FIG. 3 illustrates a process 20 for intercepting text strings input to an application such as IM client 3, according to an embodiment.

In step 22, interceptor 2 is invoked. Interceptor 2 may be included in IM client 3, and accordingly may be invoked whenever IM client 3 is invoked, e.g., whenever a user selects to open or run IM client 3. Interceptor 2 may alternatively be a plug-in application that is invoked from within IM client 3, or that IM client 3 is programmed to automatically invoke when IM client 3 is invoked. Further, interceptor 2 may alternatively be a stand-alone application that must be separately invoked, but that runs in conjunction with IM client 3 to intercept input text 12 as described herein. In any event, is to be understood that embodiments are possible in which interceptor 2 and IM client 3 are invoked simultaneously and/or nearly simultaneously, and that embodiments are also possible in which interceptor 2 and IM client 3 are invoked at different times. Regardless, process 20 continues once both interceptor 2 and IM client 3 are invoked.

Next, in step 24, interceptor 2 retrieves, and generally decrypts and loads into a memory in client computer 4, passwords and/or other sensitive sample strings 11 from database 5. As mentioned above, database 5 may be located on client computer 5 or may be located on a separate computing device and accessed via a network or like connection. In one embodiment, database 5 comprises a file of encrypted data, i.e., sample strings 11, stored on client computer 4. Encrypting sample strings 11 is optional, but generally preferable. Interceptor 2 is instructed to load the file into a memory within client computer 4 by accessing a predetermined file path that points to database 5. In another embodiment, database 5 is accessed over a network, and interceptor 2 retrieves a list of sensitive sample strings 11, e.g., passwords, by sending a predetermined query in structured query language (SQL) to a predetermined network location.

Next, in step 26, interceptor 2 waits to receive characters in input string 12. Step 26 may be executed multiple times during process 20. When interceptor 2 is invoked, input string 12 is instantiated, but is an empty, i.e., no-character, string. Thus, input string 12 is an empty string the first time step 26 is executed. When step 26 is subsequently executed, input string 12 may or may not be an empty string, as will be clear from the description of steps 28-36 below. Those skilled in the art will understand that interceptor 2 may be programmed to continuously or nearly continuously determine if a character in input string 12 has been received. If a character has not been received, process 20 repeats step 26. However, if one or more characters in input string 12 have been received, process 20 proceeds to step 28. Preferably, step 26 proceeds to step 28 upon receiving a single new character in input string 12.

In step 28, interceptor 2 compares input string 12 to sample strings 11 retrieved from database 5 in step 24, using a string comparison function such as is available in many programming languages, or some other way of comparing strings known to those skilled in the art. For example, some known ways of comparing strings do not require an exact character-for-character match, but rather indicate that two strings do, or may, match based on criteria other than, or in addition to, a strict character-for-character comparison. For instance, many word processors include spell-checking functions that access dictionaries according to predetermined rules for determining when a first string may indicate a second string, e.g., when "thier" may indicate "their." Such dictionaries and predetermined rules may be used in step 28 in some embodiments.

If more than one character was received in step 26 before proceeding to step 28, then in step 28 it is preferable to compare not only input string 12, but also one or more subsets, or substrings, of input string 12, to sample strings 11. Such subsets are determined by removing the last character from input string 12, and comparing the resulting substring of input string 12 to test strings 11. This procedure may be repeated on successive substrings of input string 12 until the resulting substring is the empty string, or until the resulting substring is one that has previously been compared in step 28.

If interceptor 2 determines that input string 12 matches a sample string 11, control proceeds to step 30. It is to be understood that, in most cases where a match is found, interceptor 2 will find a match between input string 12 and sample string 11 before all sample strings 11 retrieved from database 5 have been compared to input string 12. Nonetheless, when a match is found, process 20 proceeds immediately to step 30, without performing comparisons between input string 12 and any remaining sample strings 11. However, if all sample strings 11 retrieved from database 5 are compared with input string 12 and no match is found, process 20 proceeds to step 38.

In step 30, interceptor 2 modifies or alters input strings 12 to create output string 14 so that it does not match sample string 11. Various methods for altering input string 12 are possible, an important aspect of this alteration being to ensure that sample string 11 is not recognizable and cannot be discerned by reading input string 12 once the alteration has been accomplished. For example, interceptor 2 may be programmed to randomly substitute one or more characters for each character of input string 12 to create output string 14.

Next, in step 32, interceptor 2 raises alert 18 that input string 12 matches sample string 11. Such an alert 18 may be raised in a variety of ways, such as by causing an alert box, or window, to appear on a display of client computer 4, by causing client computer 4 to play a sound, etc.

Next, in step 34, interceptor 2 provides output string 14 to IM client 3. IM client 3 may display output string 14 in an application window, and may send output string 14 to IM server 6. Advantageously, when displayed and/or sent, output string will not include sensitive information indicated by sample strings 11. For example, if a user accidentally provides password to IM client 3, erroneously thinking that IM client 3 is a telnet window, a web browser, or some other application window requiring login information such as a password, output string 14 will be displayed in IM client 3 as some string other than input string 12, so that the actual characters in input string 12 are impossible or nearly impossible to discern.

Next, in step 36, interceptor 2 re-sets input string 12 to the empty string, i.e., to a string containing no characters. Following step 36, process 20 proceeds to step 38.

In step 38, interceptor 2 determines whether a character or characters received in step 26 are a limiting character, i.e., a character that indicates a break in or termination of input string 12. A novel aspect of the present disclosure includes the fact that input string 12 is compared to sample strings 11 before a limiting character appears in input string 12. However, once a limiting character does appear in input string 12, it is desirable to re-set input string 12 to an empty string so that additional input to IM client 3 may be compared to sample strings 11. In some embodiments, limiting characters are predetermined, while in other embodiments it is possible for a user and/or administrator to configure interceptor 2 to identify any character, e.g., any character in the standard American Standard Code for Information Interchange (ASCII) character set, as a limiting character. For example, a space character (ASCII decimal code 32) or a carriage return (ASCII decimal code 15) may be identified as limiting characters in various embodiments. A limiting character such as a carriage return may also comprise an instruction for IM client 3 to send a message, i.e., text including input string 12, to IM server 6. If a character or characters received in step 26 is a limiting character, process 20 proceeds to step 34. Otherwise, process 20 proceeds to step 40.

In step 40, interceptor 2 determines whether IM client 3 remains open, and in communication with IM server 6. If not, process 20 ends. Otherwise, process 20 returns to step 26.

FIG. 4 illustrates a second process 21 for intercepting text strings input to an application such as IM client 3, according to an embodiment. Process 21 differs from process 20 primarily by including a step for determining whether IM client 3 has received a command to send text including input string 12, as described below. In some embodiments, a user of IM client 3 is presented with an option for intercepting text strings according to either process 20 or process 21, and other embodiments use either process 20 only or process 21 only. Process 21 may in some situations allow for the consumption of fewer computing resources on client computer 4 than process 20 by checking for limiting characters in input string 12 only when a command to send a message from IM client 3 has been received.

Process 21 begins with steps 22, 24, and 26 executed as described above concerning process 20 as described with reference to FIG. 3.

In step 27, following step 26, interceptor 2 determines whether input string 12 includes a command or instruction for IM client 3 to send a message, i.e., text including input string 12. If not, process 21 proceeds to step 38. However, if input string 12 does include a command to send text including input string 12, process 21 proceeds to step 28.

Steps 28 through 40 are generally executed in process 21 as described above with reference to process 20, except that a determination that a limiting character has been received in step 38 requires that process 21 proceed to step 28 to determine whether a password is detected in input string 12, following which process 21 proceeds to step 30 and thereafter proceeds as described above with reference to process 20. Where it is determined that a limiting character has not been received in step 38 of process 21, step 34 is next executed for interceptor 2 to provide output of string 14 to IM client 3, after which process 21 proceeds to step 36, and then step 40, as described above with reference to process 20 illustrated in FIG. 3.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. For example, although embodiments are described above with reference to IM client 3, it should be understood that interceptor 2 could be included in embodiments with other applications that receive textual input. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
   receiving, by a device, information identifying one or more characters,
      the information identifying the one or more characters being input by a user of the device;
   defining, by the device, one or more limiting characters based on the received information identifying the one or more characters;
   receiving, by the device, a first alphanumeric string,
      the first alphanumeric string being received via an application window of a particular application;
   retrieving, by the device, a second alphanumeric string from a memory based on receiving the first alphanumeric string;
   comparing, by the device, the first alphanumeric string to the second alphanumeric string to determine whether the first alphanumeric string corresponds to the second alphanumeric string;
   after comparing the first alphanumeric string to the second alphanumeric string, determining, by the device, whether the first alphanumeric string includes at least one of the one or more limiting characters;
   automatically modifying, by the device, the first alphanumeric string to form a modified string, when a result of comparing the first alphanumeric string to the second alphanumeric string indicates that the first alphanumeric string corresponds to the second alphanumeric string,
      modifying the first alphanumeric string including:
         forming the modified string by randomly substituting at least one alphanumeric character for each alphanumeric character of the first alphanumeric string;
   outputting, by the device, the first alphanumeric string to the application window of the particular application when:
      the first alphanumeric string does not include the at least one of the one or more of the limiting characters, and
      the result does not indicate that the first alphanumeric string corresponds to the second alphanumeric string,
         outputting the first alphanumeric string to the application window of the particular application causing the first alphanumeric string to be displayed via the application window of the particular application, and
         the first alphanumeric string not being displayed via the application window of the particular application prior to being output by the device to the application window of the particular application;
   outputting, by the device, the modified string to the application window of the particular application when:
      the first alphanumeric string does not include the at least one of the one or more of the limiting characters, and
      the result indicates that the first alphanumeric string corresponds to the second alphanumeric string,
         outputting the modified string to the application window of the particular application causing the modified string to be displayed via the application window of the particular application; and
   transmitting, by the device, one of the first alphanumeric string or the modified string when the first alphanumeric string includes at least one of the one or more limiting characters,
      the modified string being transmitted when the result indicates that the first alphanumeric string corresponds to the second alphanumeric string.

2. The method of claim 1, where transmitting the one of the first alphanumeric string or the modified string includes:
   transmitting the first alphanumeric string or the modified string to an instant messaging server.

3. The method of claim 1, where the second alphanumeric string is in an encrypted format, the method further comprising:
   decrypting the second alphanumeric string,
      where comparing the first alphanumeric string to the second alphanumeric string is based on decrypting the second alphanumeric string.

4. The method of claim 1, further comprising:
   providing, for display, an alert when the result indicates that the first alphanumeric string corresponds to the second alphanumeric string.

5. The method of claim 1, where information identifying the one or more characters includes at least one of:
   information identifying a carriage return, or
   information identifying a space.

6. The method of claim 1, where the first alphanumeric string is a subset of an input string.

7. The method of claim 1, further comprising:
   setting, after transmitting the one of the first alphanumeric string or the modified string, the first alphanumeric string equal to an empty string.

8. The method of claim 1, further comprising:
   receiving, when the result does not indicate that the first alphanumeric string corresponds to the second alphanumeric string and when the first alphanumeric string does not include at least one of the one or more limiting characters, a third alphanumeric string,
      where the third alphanumeric string includes the first alphanumeric string;

comparing the third alphanumeric string to a fourth alphanumeric string;

determining whether the third alphanumeric string includes one of the one or more limiting characters;

automatically modifying the third alphanumeric string, to form another modified string, when another result of comparing the third alphanumeric string to the fourth alphanumeric string indicates that the third alphanumeric string corresponds to the fourth alphanumeric string; and transmitting the other modified string when the other result indicates that the third alphanumeric string corresponds to the fourth alphanumeric string and the third alphanumeric string includes the one of the one or more limiting characters.

9. A non-transitory computer-readable memory device storing instructions, the instructions comprising:

one or more instructions which, when executed by one or more processors, cause the one or more processors to:

define, based on one or more characters input by a user, one or more limiting characters, receive a first alphanumeric string,
the first alphanumeric string being received via an application window of a particular application, retrieve a second alphanumeric string from a database,
the second alphanumeric string being retrieved based on receiving the first alphanumeric string, compare the first alphanumeric string to the second alphanumeric string, determine, based on comparing the first alphanumeric string to the second alphanumeric string, whether the first alphanumeric string corresponds to the second alphanumeric string, automatically modify, when the first alphanumeric string corresponds to the second alphanumeric string, the first alphanumeric string to form a modified string,
the one or more instructions to automatically modify the first alphanumeric string including:
one or more instructions to form the modified string by randomly substituting each alphanumeric character of the first alphanumeric string for at least one different alphanumeric character, determine whether the first alphanumeric string includes one of the one or more limiting characters, output the first alphanumeric string to the application window of the particular application when:
the first alphanumeric string does not include the one of the one or more limiting characters, and
the first alphanumeric string does not correspond to the second alphanumeric string,
outputting the first alphanumeric string to the application window of the particular application causing the first alphanumeric string to be displayed via the application window of the particular application, and
the first alphanumeric string not being displayed via the application window of the particular application prior to being output to the application window of the particular application, output the modified string to the application window of the particular application when:
the first alphanumeric string does not include the one of the one or more limiting characters, and
the first alphanumeric string corresponds to the second alphanumeric string,
outputting the modified string to the application window of the particular application causing the modified string to be displayed via the application window of the particular application, and transmit the modified string or the first alphanumeric string when the first alphanumeric string includes the one of the one or more limiting characters,
the modified string being transmitted when the first alphanumeric string corresponds to the second alphanumeric string.

10. The non-transitory computer-readable memory device of claim 9, where the one or more instructions to transmit the first alphanumeric string or the modified string include:

one or more instructions to transmit the modified string or the first alphanumeric string to an instant messaging server.

11. The non-transitory computer-readable memory device of claim 9, where the second alphanumeric string is stored in an encrypted format, and where the instructions further comprise:
one or more instructions to decrypt the second alphanumeric string.

12. The non-transitory computer-readable memory device of claim 9, where the instructions further comprise:

one or more instructions to generate an alert when the first alphanumeric string corresponds to the second alphanumeric string.

13. The non-transitory computer-readable memory device of claim 9, where the one or more limiting characters includes a carriage return and a space.

14. The non-transitory computer-readable memory device of claim 9, where the first alphanumeric string is a subset of an input string.

15. A system comprising:

a memory comprising at least one sample alphanumeric string; and a computing device to:
define a character, received from a user of the computing device, as a limiting character, receive an input alphanumeric string,
the input alphanumeric string being received via an application window of a particular application, compare the input alphanumeric string to the at least one sample alphanumeric string, determine, based on comparing the input alphanumeric string to the at least one sample alphanumeric string, whether the input alphanumeric string matches the at least one sample alphanumeric string, automatically modify, when the input alphanumeric string matches the at least one sample alphanumeric string, the input alphanumeric string to form a modified string,
when modifying the input alphanumeric string, the computing device being to:
randomly substitute each alphanumeric character of the input alphanumeric string for at least one different alphanumeric character, determine whether the limiting character has been received, output the input alphanumeric string to the application window when:
the input alphanumeric string does not match the at least one sample alphanumeric string, and the limiting character has not been received,
outputting the input alphanumeric string to the application window causing the input alphanumeric string to be displayed via the application window, and
the input alphanumeric string not being displayed via the application window prior to being output to the application window of the particular application,
output the modified string to the application window when:
the input alphanumeric string matches the at least one sample alphanumeric string, and
the limiting character has not been received,
outputting the modified string to the application window causing the modified string to be displayed via the application window, and
transmit the input alphanumeric string or the modified string when the limiting character has been received, the modified string being transmitted when the input alphanumeric string matches the at least one sample string.

16. The system of claim 15, further comprising:
an instant messaging client to:
receive the modified string or the input alphanumeric string, and
send the modified string or the input alphanumeric string to an instant messaging server.

17. The system of claim 15, where the at least one sample alphanumeric string is stored in an encrypted format, and
where the computing device is further to:
decrypt the sample alphanumeric string.

18. The system of claim 15, where the computing device is further to:
transmit an alert when the input alphanumeric string matches the at least one sample alphanumeric string.

19. The system of claim 15, where the character includes one of a carriage return or a space.

20. The system of claim 15, where the input alphanumeric string comprises a subset of an input provided to an instant messaging client by the user.

* * * * *